United States Patent Office 3,726,879
Patented Apr. 10, 1973

3,726,879
CERTAIN SUBSTITUTED 2-ANILINO-
NICOTINIC ACID DERIVATIVES
Ernst Jucker, Ettingen, Adolf Lindenmann, Basel, and
Fulvio Gadient, Birsfelden, Switzerland, assignors to
Sandoz Ltd., Basel, Switzerland
No Drawing. Continuation-in-part of abandoned application Ser. No. 578,158, Sept. 9, 1966. This application Oct. 14, 1968, Ser. No. 767,495
Int. Cl. C07d 31/36
U.S. Cl. 260—295.5 R
3 Claims

ABSTRACT OF THE DISCLOSURE

The invention concerns nicotinic acid derivatives, namely, 2-(2-methyl-3-nitro-phenylamino)nicotinic acid and its alkali metal and alkaline early metal salts. The compounds have pharmacological properties characterizing them as anti-inflammatories.

---

This is a continuation-in-part of application Ser. No. 578,158, filed on Sept. 9, 1966, now abandoned.

The invention concerns a new nicotinic acid derivative and a process for its production. The present invention provides 2-(2-methyl-3-nitro-phenylamino)nicotinic acid of Formula I,

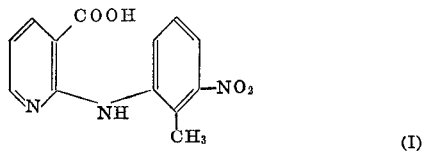

and its alkali metal and alkaline earth metal salts.

The present invention further provides a process for the production of 2-(2-methyl-3-nitro-phenylamino)nicotinic acid and its alkali metal and alkaline earth metal salts, characterized in that a nicotinic acid derivative of general Formula II,

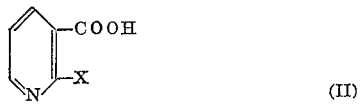

in which X signifies a fluorine, chlorine, bromine or iodine atom or an amino radical,
is condensed in manner known per se with a compound of general Formula III,

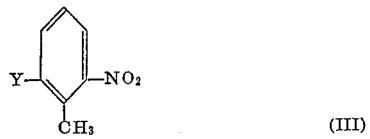

in which Y signifies an amino radical when X signifies a fluorine, chlorine, bromine or iodine atom, or
Y signifies a fluorine, chlorine, bromine or iodine atom when X signifies an amino radical,
in a solvent or solvent mixture which is inert under the reaction conditions, in the presence of a catalyst and a basic condensation agent, and the resulting 2-(2-methyl-3-nitro-phenylamino)nicotinic acid is then optionally converted into its alkali metal and alkaline earth metal salts in manner known per se.

Copper bronze or copper compounds, e.g. copper-(I)- or copper-(II)-halides, copper-(II)-acetate or copper oxide may, for example, be used as catalysts in the process of the invention. Inorganic or tertiary organic bases, e.g. sodium or potassium carbonate, triethylamine, trimethylamine or pyridine may be used as basic condensation agent.

The reaction is preferably effected at the boiling temperature of the solvent or solvent mixture used. The reaction time is from 6 hours to 5 days. In accordance with the invention water, n-amyl alcohol, 4-methyl-pentanol-(2) and diethylene glycol dimethyl ether may, for example, be used as solvents, while benzyl alcohol/cyclohexanol or 4-methyl-pentanol-(2)/benzyl alcohol may, for example, be used as solvent mixture for the condensation.

The nicotinic acid derivatives of general Formula II used in the process of the invention may be used either as free acids or in the form of their alkali metal salts, e.g. the potassium salt.

One method of effecting the process of the invention is as follows:

2-amino-nicotinic acid, copper bronze and potassium carbonate are dissolved in amyl alcohol and the resulting reaction mixture is heated to the boil whilst stirring, preferably until water no longer distils off. A solution of 2-iodo-6-nitrotoluene is amyl alcohol preheated to about 40° C. is subsequently added and the mixture is kept at the boil for a further 24 hours. The reaction mixture is then cooled and the precipitated material filtered off and washed with ethanol. For further purification the filter residue is first suspended in absolute ethanol and then in water and filtration is effected. The filter residue is dissolved in water at the boil, is filtered with charcoal and allowed to cool to room temperature.

A further method of effecting the process of the invention consists in that an alkali metal carbonate is added to a solution of 2-chloro-nicotinic acid in diethylene glycol dimethyl ether at an elevated temperature (about 80° C.) whilst stirring, stirring is continued for about 30 minutes and 2-amino-6-nitrotoluene and copper bronze are added. The resulting reaction mixture is subsequently maintained at the boil for 4 days. Cooling to room temperature is then effected, the insoluble material is filtered off and the filtrate worked up in manner known per se, e.g. by evaporating, dissolving the residue, e.g. in ethanol, reprecipitating and extracting with an aqueous alkali metal hydroxide solution.

The 2-(2-methyl-3-nitro-phenylamino)nicotinic acid obtained in accordance with the two processes indicated above is isolated from the solution by precipitating with a dilute mineral acid and is purified in manner known per se by recrystallization.

The resulting 2-(2-methyl-3-nitro-phenylamino)nicotinic acid may then optionally be converted into its alkali metal or alkaline earth metal salts in manner known per se.

The starting materials used in the process of the invention are either known or may be produced in a manner known per se.

The 2-(2-methyl-3-nitro-phenylamino)nicotinic acid of the invention is a crystalline compound at room temperature; it may be converted into the corresponding salts by reacting with suitable alkali metal or alkaline earth metal bases. Examples of such salts are the sodium, potassium, lithium and calcium salts.

The nicotinic acid derivative of the present invention has pharmacodynamic properties which make it a valuable medicament. Thus, it is characterized by a strong edema inhibitory effect, it causes an improvement in the functioning of pathologically stiffened joints and it minimizes sensitivity to pain in inflamed extremities. A special advantage of the compound of the invention is that it does not influence the electrolyte and water levels of the organism, i.e. even when administered in amounts sufficient to exhibit all its useful pharmacodynamic properties, it causes no liquid retention in the kidneys.

In U.S.A. Pat. No. 3,337,570, there are described various nicotinic acid derivatives. The nicotinic acid derivative disclosed in the said U.S.A. patent which is the closest to the nicotinic acid derivative of the present invention is 2-(2-methyl-3-chloroanilino) nicotinic acid, and the Peritonitis test, generally employed in assessing anti-inflammatory activity (Bucher, K.: Helv. Physiol. Acta, 17, 329, 1959) was carried out on the nicotinic acid derivative of the present invention and 2-(2-methyl-3-chloroanilino) nicotinic acid. In the following description concerning the Peritonitis test and the results obtained in the test, the nicotinic acid derivative of the present invention is referred to as compound A, and 2-(2-methyl-3-chloroanilino)nicotinic acid is referred to as compound B. In the Peritonitis test, healthy and hungry guinea pigs are given talcum intraperitoneally which causes a condition of acute peritonitis. This has a detrimental effect on the general condition of the animals, and causes them to refuse food. An anti-inflammatory causes the animals to take food again. A measure of the anti-inflammatory activity is obtained by noting the number of animals which are caused to take food after having been treated with the anti-inflammatory. The strength of an anti-inflammatory is then expressed as an $ED_{50}$ value (i.e. that dosage at which 50% of the animals are caused to take food). The results obtained in this test with the compounds A and B are shown in the following table.

| Compound | Number of guinea pigs (separate groups of six) | Dose, mg./kg., s.c. | $ED_{50}$ value, mg./kg., s.c. |
|---|---|---|---|
| A | 12<br>12<br>12 | 0.10<br>1.00<br>10.00 | 1.4 |
| B | 18<br>18<br>18 | 0.10<br>1.00<br>10.00 | 3.2 |

As follows from the above table, the compound A is considerably more active than the compound B, illustrating the significant difference in activity between the compounds.

The compound of the present invention has a particularly low toxicity, a factor important in the field of anti-inflammatory agents which are administered at relatively high dosages. For example, the $LD_{50}$ value in mice for the compound of the present invention is 103 mg./kg. i.v. (noted after 24 hours), and 440 mg./kg. p.o. (noted after 10 days). Side effects are insignificant at a dose of 75 mg./kg. i.v., although slight irregular breathing, lasting for about 10 minutes, is noted at this dosage.

The compound of the present invention is indicated for use in the treatment of acute and chronic inflammation conditions of diverse origins and as analgesic in diverse pain conditions. A suitable daily dose of the compound is 100 to 500 mg., and it may be used as a pharmaceutical on its own or in the form of appropriate medicinal preparations for administration, e.g. enterally or parenterally.

In order to produce suitable medicinal preparations the compound is worked up with inorganic or organic adjuvants which are inert and physiologically acceptable. Examples of such adjuvants are:

for tablets and dragées: lactose, starch, talc and stearic acid;
for injectable solutions: water, alcohols, glycerin and vegetable oils.

The preparations may furthermore contain suitable preserving, stabilizing and wetting agents, solubilizers, sweetening and colouring substances and flavourings.

The new nicotinic acid derivative may also be used in combination with other antirheumatics, e.g. with salicylates, steroids, 3,5-dioxo-pyrazolidine derivatives and/or with analgesics, e.g. pyrazol-(5)-one derivatives.

The above indicated effects and uses of the new nicotinic acid derivative also apply to its alkali metal and alkaline earth metal salts, inasfar as the toxic effect of the cation does not preclude its use in therapy.

The term "in manner known per se" as used herein designates methods in use or described in the literature on the subject.

In the following non-limitative examples all temperatures are indicated in degrees centigrade and are uncorrected.

EXAMPLE 1

2-(2-methyl-3-nitro-phenylamino)nicotinic acid

A mixture of 138 g. of 2-amino-nicotinic acid, 266 g. of potassium carbonate, 24 g. of copper bronze and 3000 cc. of n-amyl alcohol is heated in a water separator on an oil bath at 180° until water no longer distils off. After the addition of a solution preheated to about 40° of 382 g. of 2-iodo-6-nitrotoluene in 380 cc. of n-amyl alcohol during the course of 10 minutes, the reaction mixture is heated in a water separator on an oil bath at 180° for 24 hours. Cooling is subsequently effected to about 40°, the insoluble material is filtered off and washed with absolute ethanol. The moist residue is suspended at room temperature first in 2.5 litres of absolute ethanol and then in 2.5 litres of water, is filtered off and dissolved at the boil in 9 litres of tap water. The solution is subsequently filtered with charcoal and adjusted to a pH value of 5 by the addition of about 330 cc. of 10% hydrochloric acid at room temperature. The resulting precipitate is filtered off, dried and recrystallized from ethanol. The resulting pure 2-(2-methyl-3-nitro-phenylamino)nicotinic acid has a melting point of 242–244°.

Production of the potassium compound of 2-(2-methyl-3-nitrophenylamino)nicotinic acid 5.46 g. of 2-(2-methyl-3-nitro-phenylamino)nicotinic acid are dissolved in 150 ml. of ethanol by heating and a solution of 1.35 g. of potassium hydroxide in 50 ml. of ethanol is added thereto. After cooling to room temperature the red potassium compound is filtered off, is washed twice, each time with 50 ml. of ethanol and dried. Melting point: above 300°.

Production of the sodium compound of 2-(2-methyl-3-nitrophenylamino)nicotinic acid 5.46 g. of 2-(2-methyl-3-nitro-phenylamino)nicotinic acid are dissolved in 150 ml. of ethanol by heating and a solution of 0.96 g. of sodium hydroxide in 50 ml. of ethanol is added thereto. After cooling to room temperature the red sodium compound is filtered off, washed twice, each time with 50 ml. of ethanol and dried. Melting point: above 300°.

EXAMPLE 2

2-(2-methyl-3-nitro-phenylamino)nicotinic acid 5.5 g. of potassium carbonate are added portionwise at 80° whilst stirring to a solution of 12.6 g. of 2-chloro-nicotinic acid in 200 cc. of diethylene glycol dimethyl ether. Stirring is effected for a further 20 minutes, 12.2 g. of 2-amino-6-nitrotoluene and 1.2 g. of copper bronze are added and the mixture is subsequently heated to 150° for 4 days. After cooling to room temperature the insoluble material is filtered off, the filtrate is evaporated at 15 mm. of Hg and the oily residue dissolved in 100 cc. of ethanol. After cooling to about 5° the crystalline precipitate is filtered off and is divided between 50 cc. of ether and 50 cc. of 2 N sodium hydroxide. The alkaline extract is separated, acidified with 5 N hydrochloric acid and extracted thrice, each time with 50 cc. of ether. After washing with water and drying over magnesium sulphate the ether extract is dried and the residue recrystallized from dimethyl formamide/water (4:1). The resulting 2-(2-methyl-3-nitro-phenylamino)nicotinic acid has a melting point of 242–245°.

What is claimed is:
1. A compound of the group consisting of an aniline nicotinic acid having the structure:

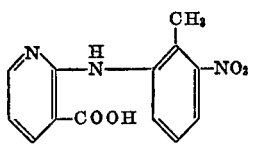

and the alkali metal and alkaline eatrh metal salts thereof.

2. A compound of the group consisting of an aniline nicotinic acid having the structure:

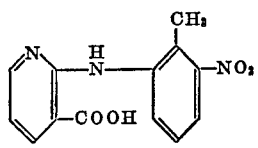

and the alkali metal salts thereof.

3. The aniline nicotinic acid having the structural formula:

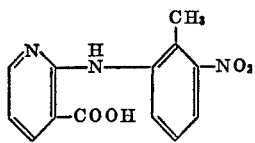

References Cited
UNITED STATES PATENTS

| | | | |
|---|---|---|---|
| 3,337,570 | 8/1967 | Sherlock et al. | 260—295.5 |
| 3,415,834 | 12/1968 | Hoffmann | 260—295.5 |
| 3,366,640 | 1/1968 | Sherlock et al. | 260—295.5 |

JOHN D. RANDOLPH, Primary Examiner

A. L. ROTMAN, Assistant Examiner

U.S. Cl. X.R.

424—266